United States Patent [19]

Stenger

[11] Patent Number: 4,509,821

[45] Date of Patent: Apr. 9, 1985

[54] FILLING MATERIAL FOR ELECTRIC CABLE

[75] Inventor: Richard J. Stenger, Wilmington, Del.

[73] Assignee: Sun Tech, Inc., Philadelphia, Pa.

[21] Appl. No.: 528,489

[22] Filed: Sep. 1, 1983

Related U.S. Application Data

[63] Continuation-in-part of Ser. No. 507,955, Jun. 27, 1983, abandoned, which is a continuation of Ser. No. 300,789, Sep. 10, 1981, abandoned.

[51] Int. Cl.³ .................................................. G02B 5/16
[52] U.S. Cl. ................................... 350/96.23; 523/173; 524/476; 524/487; 524/489; 174/23 C
[58] Field of Search ...................... 350/96.23; 524/476, 524/487, 489; 174/23 C

[56] References Cited

U.S. PATENT DOCUMENTS

| 3,870,575 | 4/1975 | Dobbin et al. | 174/23 C |
| 4,085,186 | 4/1978 | Rainer | 260/878 |
| 4,176,240 | 11/1979 | Sabia | 174/23 C |
| 4,259,540 | 3/1981 | Sabia | 174/23 C |

*Primary Examiner*—Josephine L. Barr
*Attorney, Agent, or Firm*—J. Edward Hess; Donald R. Johnson; Stanford M. Back

[57] ABSTRACT

A cable fill composition comprising a paraffinic oil, a styrene-ethylene butylene-styrene block copolymer, and a linear polyethylene wax having an average molecular weight in the range of from about 1000 to 1500, whereby an improved drip point of the composition is obtained.

8 Claims, 1 Drawing Figure

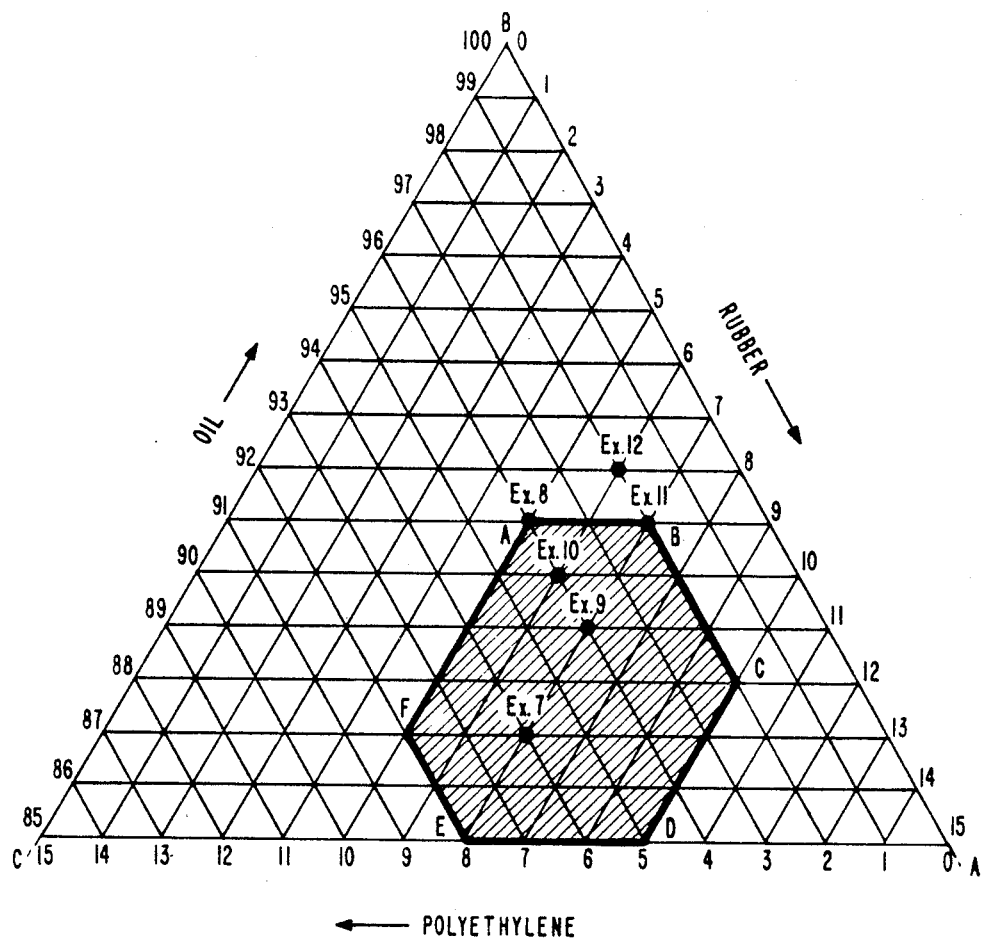

FILLING MATERIAL FOR ELECTRIC CABLE

CROSS REFERENCE TO RELATED APPLICATIONS

This application is a continuation-in-part of U.S. application Ser. No. 507,955, filed June 27, 1983, which, in turn, is a continuation of U.S. application Ser. No. 300,789, filed Sept. 10, 1981 (both now abandoned).

BACKGROUND OF THE INVENTION

In the disclosure of U.S. Pat. No. 4,176,240, and U.S. Pat. No. 4,259,540 which disclosures are hereby incorporated by reference, a filling material for electrical and light conducting cable is described which provides water-proofing for underground telephone cable. The composition described in U.S. Pat. No. 4,176,240 for that use is said to be comprised of three components: (1) ASTM Type 104 A(naphthenic) oil having a minimum sp. gr. of 0.860, a minimum SUS viscosity at 210 degrees F. of 45, a maximum pour point ASTM D 97 of 10 degrees F. and a maximum of 5 percent aromatic oils; (2) a styrene-ethylene butylene-styrene block copolymer having a styrene-rubber ratio of approximately 0.4 and (3) a polyethylene having a softening point of 110 degrees C. to 130 degrees C. The composition of U.S. Pat. No. 4,259,540 is similar, but the oil may be paraffinic or naphthenic with a somewhat higher maximum pour point and the block copolymer styrene-rubber ratio may be from approximately 0.2 to 0.5.

Such cable fill compositions as described in the above mentioned patents are deficient in use in that they have two severely limiting properties; namely: (1) when the temperature approaches 150° F. the fill material drips out of the cable, and (2) the temperature at which the cable is filled is limited to 110° C. (230° F.) because of the potential damage to the polyethylene insulation at a higher temperature, but even at this temperature the viscosity of the prior art cable fill is not sufficiently low (i.e., fluid) to ensure that all of the crevices in the bundle of wires will be filled with the waterproofing composition. This is particularly true for cable cores having 500 or more wire pairs. This invention increases the utility of a gelled oil composition significantly, not only making it suitable for cable makers who require at least 170° F. drip temperature, but since the viscosity of the improved composition is about one-half of that of the prior art composition at the filling temperature, greater assurance is obtained that the cables will be completely filled and the risk of damaging insulation during filling is also reduced since lower fill temperatures can be used. In addition, this invention enables cables with a large number of wire pairs to be filled reliably without the need to preheat the core as is sometimes done in using the gels available heretofore.

SUMMARY OF THE INVENTION

In accord with this invention, a cable fill composition is provided which comprises (1) ASTM Type 103, 104A, 104B or mixtures thereof (naphthenic or paraffinic) oil having a minimum sp. g. of 0.860, a minimum SUS viscosity at 210 degrees F. of 45, a maximum pour point ASTM D 97 of 20 degrees F. and maximum of 5 percent aromatic oils, (2) a styrene-ethylene butylene-styrene block copolymer having a styrene-rubber ratio of from approximately 0.2 to 0.5, preferably approximately 0.4 and (3) a linear polyethylene wax having an average molecular weight in the range of from about 1000 to 1500. This polyethylene wax has a viscosity ranging from about 13 to 30 cps at 140° C., a rather sharp melting point within the range of from about 230° to 245° F., a density of about 0.96 and a comparatively narrow molecular weight distribution as compared to the polyethylene disclosed in U.S. Pat. No. 4,176,240. Such commercially available waxes as Polywax 1000 and Polywax 1500 from the Bareco Division of Petrolite Corporation may be employed in this invention and it is the use of such a linear polyethylene wax which imparts the improved properties to the composition of the invention.

BRIEF DESCRIPTION OF THE DRAWING

The FIGURE is a ternary compositional diagram taken from U.S. Pat. No. 4,176,240 giving the composition ranges of the cable filling material of the invention.

DETAILED DESCRIPTION

Two typical compositions illustrating the scope of this invention are as follows:

| Formulation I: | |
|---|---|
| 89% | 175 SUS/100F Paraffin Oil |
| 5% | Bareco Polywax 1000; Linear, narrow M.W. Polyethylene |
| 6% | Kraton 1652 Rubber, block copolymer. |

| Formulation II: | |
|---|---|
| 89% | 175 SUS/100F Paraffin Oil |
| 5% | Bareco Polywax 1500; Linear, narrow M.W. Polyethylene |
| 6% | Kraton 1652 Rubber, block copolymer. |

These compositions are characterized in their viscosity and drip temperature and compared with the properties of the prior art cable fill composition in the following table:

| Brookfield Viscosity, cP | Properties of Gelled Oil Filling Compound | | |
|---|---|---|---|
| | Prior Art+ | Formulation I | Formulation II |
| 200° F. | 200+ | 47 | 55 |
| 210° F. | 80 | 33 | 40 |
| 220° F. | 60 | 29 | 32 |
| 230° F. | 45 | 25 | 29 |
| 240° F. | 40 | 21 | 24 |
| 266° F. | 30 | 18 | 19 |
| Drip Temp, °F.* | 150–152 | 175+ | 195+ |

*Determined by holding a 20 g. sample in a 3" diameter dish vertically in a forced air oven for 2 hours.
+Using the polyethylene disclosed in U.S. Pat. No. 4,176,240 and U.S. Pat. No. 4,259,540.

As can be seen, viscosity of the composition of this invention is significantly lower and drip temperature significantly higher than the prior art composition.

The proportions of paraffin oil, linear polyethylene wax, and rubber for the composition of the invention will be the same as that for the corresponding oil, rubber, and polyethylene disclosed in U.S. Pat. No. 4,176,240 and U.S. Pat. No. 4,259,540 which is defined by the area bounded by ABCDEF of the figures of these patents. Preferably, however, the amount of paraffin oil will be from about 85% to about 90%, the amount of linear polyethylene wax will be from about 4% to about 6% and the amount of rubber block copolymer will be from about 5% to about 8%.

The cable fill composition of the invention is readily used in the conventional electrical and light conducting cable filling operations used in industry. One much used technique is a pressure filling technique where the completed core, without wrap is passed through a tube 2 to 6 feet long. The molten gelled oil compound is forced into the core as it passes through chilled sections on each end preventing molten material from squirting out; some techniques apply vacuum just ahead of the pressure sections.

If it is difficult to force the filling material into the center of large pair count fine gauge cores a separation device which spreads the units apart in the pressure tube may be used.

The most desirable place to fill is at the sheathing line. However, filling at the stranding line can be done satisfactorily if a wrapping is applied to contain the filler. The filled core, of course, must then be wound on a reel and then unwound as it is sheathed.

When the above described cable fill is used in the pressure fill technique described above, a filled cable is obtained which is completely filled with gel, exhibits no drip problems below 170° F. and also meets all of the tests necessary for high performance; e.g. electrical resistance, water resistance, and the like.

I claim:

1. A cable comprising:
   a plurality of conductors contained within a sheath leaving voids between the conductors, and between the conductors and the sheath, and a filling material filling the voids the invention characterized in that the filling material comprises a mixture of:
   (X) ASTM Type 103, 104A or 104B, or mixtures thereof, (paraffinic or naphthenic) oil having a minimum sp. gr. of 0.860, a minimum SUS viscosity at 210 degrees F. of 45, a maximum pour point ASTM D 97 of 20 degrees F. and a maximum of 5 percent aromatic oils,
   (Y) a styrene-ethylene butylene-styrene block copolymer having a styrene-rubber ratio of approximately 0.2 to 0.5, and
   (Z) a linear polyethylene wax having an average molecular weight in the range of from about 1000 to 1500, the ingredients X, Y and Z having relative proportions falling within the shaded area bounded by ABCDEF of the FIGURE.

2. The cable of claim 1 in which the conductors are electrical conductors.

3. The cable of claim 1 in which the conductors are light conductors.

4. A cable fill composition comprising
   (X) ASTM Type 103, 104A, or 104B, or mixtures thereof (paraffinic or naphthenic) oil having a minimum sp. gr. of 0.860, a minimum SUS viscosity at 210 degrees F. of 45, a maximum pour point ASTM D 97 of 20 degrees F. and a maximum of 5 percent aromatic oils,
   (Y) a styrene-ethylene butylene-styrene block copolymer having a styrene-rubber ratio of approximately 0.2 to 0.5, and
   (Z) a linear polyethylene wax having an average molecular weight in the range of from about 1000 to 1500, the ingredients X, Y and Z having relative proportions falling within the shaded area bounded by ABCDEF of the FIGURE.

5. The composition of claim 4 wherein the amount of (X) is from about 85% to about 90%, the amount of (Y) is from about 5% to about 8% and the amount of (Z) is from about 4% to about 6%.

6. The composition of claim 4 wherein the amount of (X) is about 89%, the amount of (Y) is about 6% and the amount of (Z) is about 5%.

7. The composition of claim 4 wherein component (X) has a pour point ASTM 97 of zero degrees F.; SUS viscosity at 210° F. of S-3.7; sp. gr. (ave.) of 0.884; and maximum aromatic oils of 1%.

8. The compositions of claim 4, 5, 6, or 7 wherein the styrene-rubber ratio is approximately 0.4.

* * * * *